Oct. 29, 1957     E. C. KRADOSKA     2,811,192
BEAD FORMING AND RE-ROLLING MACHINE
Filed Oct. 18, 1954     7 Sheets-Sheet 1

INVENTOR.
Edward C. Kradoska
BY
Louis Necho
Attorney

Oct. 29, 1957   E. C. KRADOSKA   2,811,192
BEAD FORMING AND RE-ROLLING MACHINE
Filed Oct. 18, 1954   7 Sheets-Sheet 2
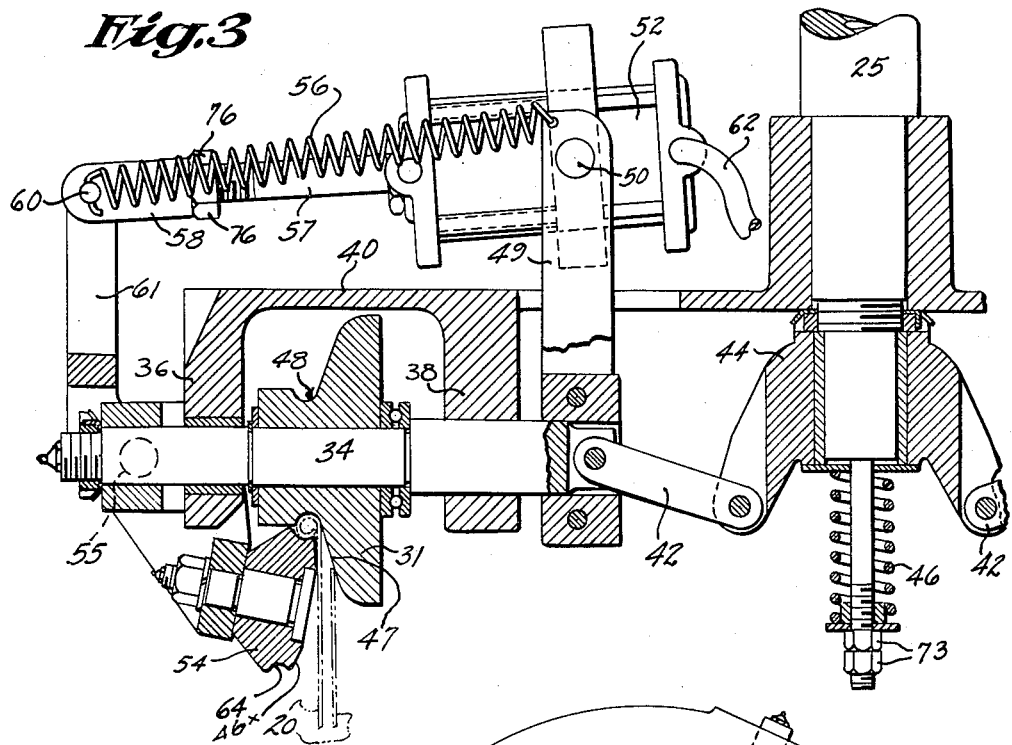
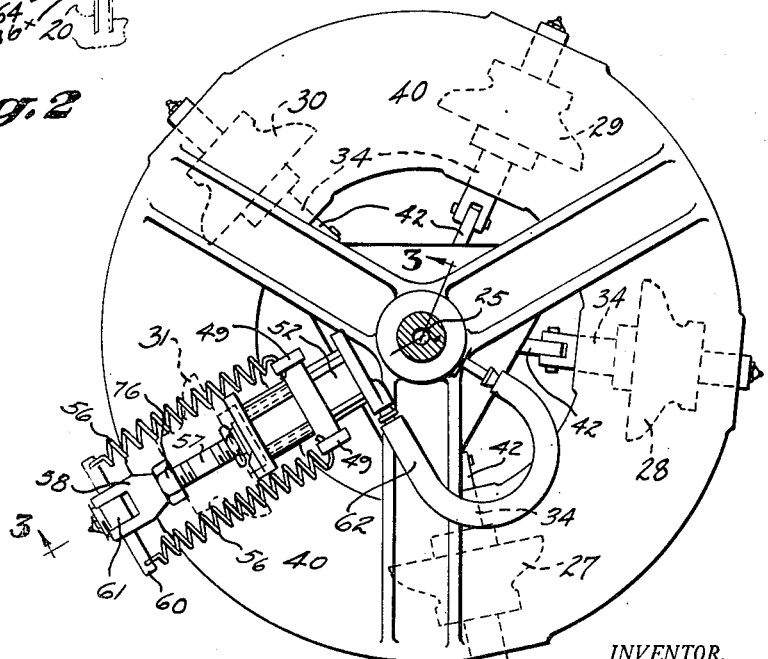
INVENTOR.
*Edward C. Kradoska*
BY
*Louis Necho*
Attorney

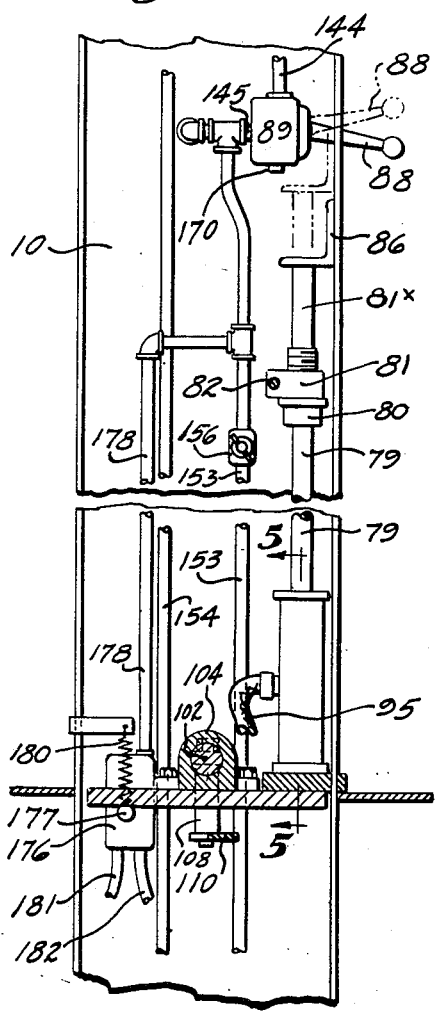
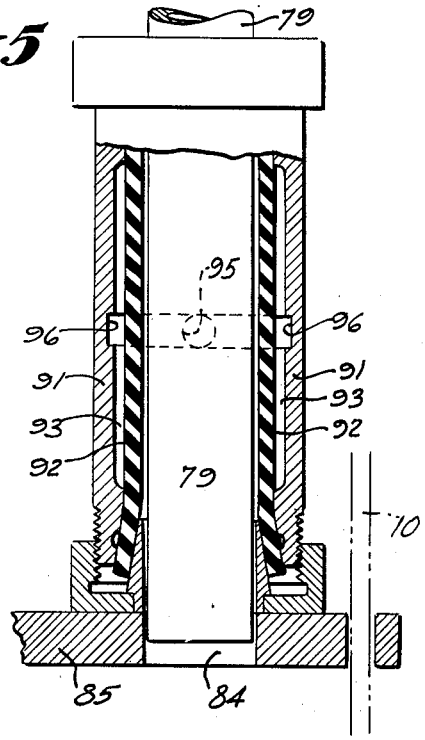
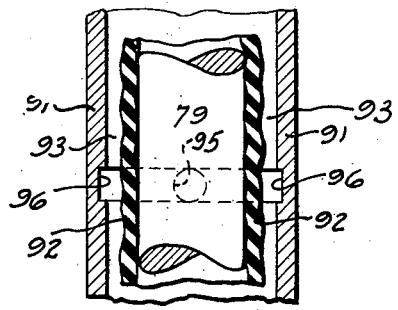
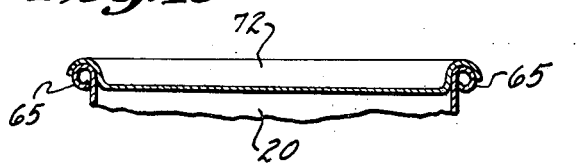

Oct. 29, 1957  E. C. KRADOSKA  2,811,192
BEAD FORMING AND RE-ROLLING MACHINE
Filed Oct. 18, 1954  7 Sheets-Sheet 4

INVENTOR.
Edward C. Kradoska
BY
Louis Necho
Attorney

Oct. 29, 1957  E. C. KRADOSKA  2,811,192
BEAD FORMING AND RE-ROLLING MACHINE
Filed Oct. 18, 1954  7 Sheets-Sheet 5

INVENTOR.
Edward C. Kradoska
BY
Louis Necho
Attorney

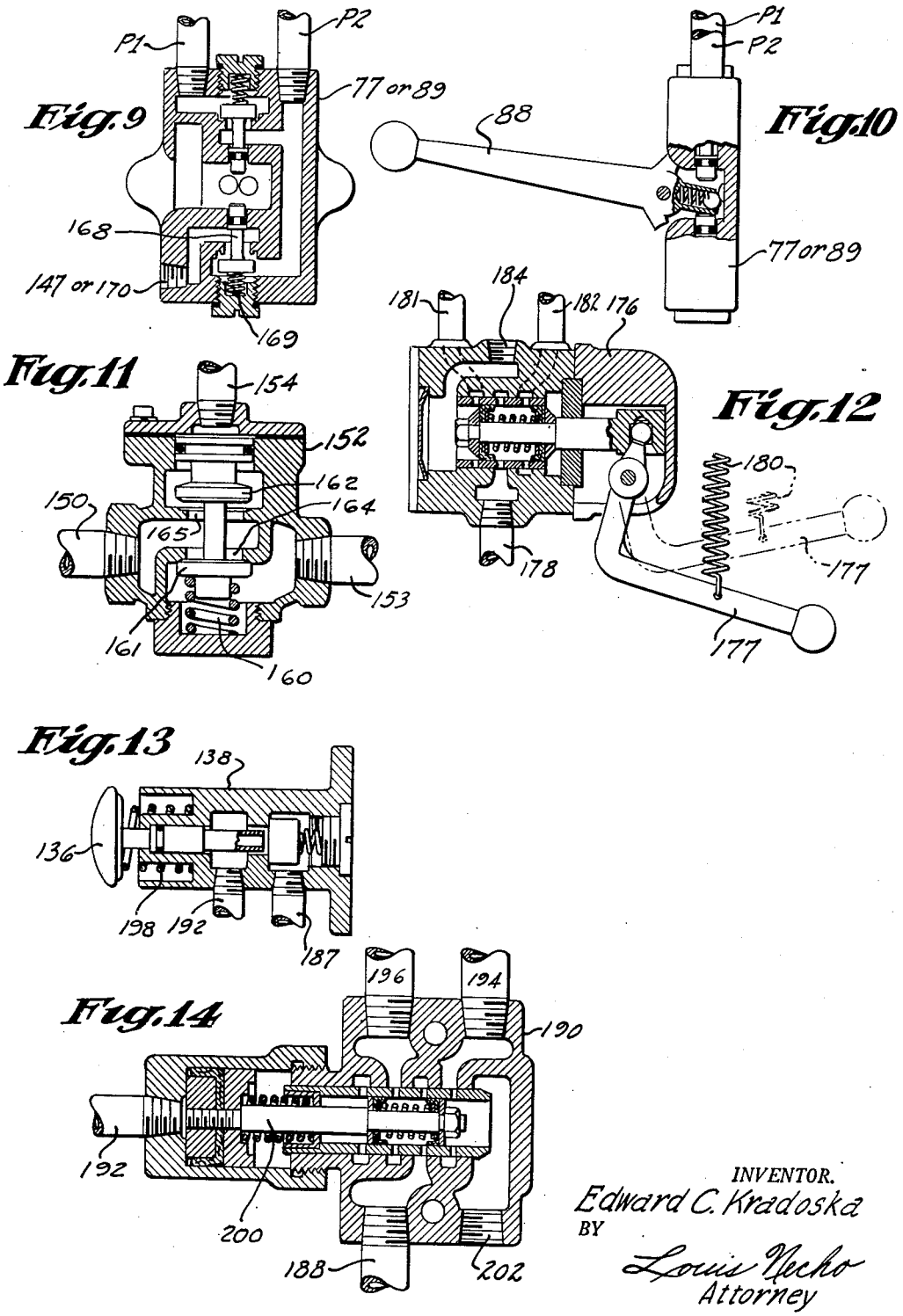

United States Patent Office 2,811,192
Patented Oct. 29, 1957

2,811,192

BEAD FORMING AND RE-ROLLING MACHINE

Edward C. Kradoska, Melrose Park, Pa.

Application October 18, 1954, Serial No. 462,745

13 Claims. (Cl. 153—59)

My invention relates to machine of the type used for forming, or for re-rolling a bead on the rim of a metallic drum or similar open end container.

One object of the invention is to provide an improved machine of the type set forth.

Steel drums vary somewhat in height and diameter, as well as in the thickness or rigidity of the metal from which they are formed.

It is therefore a further object of the invention to produce an improved machine which is "flexible" in its structure and operation whereby beads can be formed on drums of various types and sizes and whereby already existing beads on drums of different types and sizes may be re-rolled.

In some cases it is desirable that the lid of a drum relatively tightly engage the beaded open end of the drum and, in other cases, it may be desirable that the lid relatively loose engage said bead.

It is therefore a still further object of the invention to produce an improved machine whereby the degree of tightness with which the lid of a drum engages the bead on the open end of said drum may be easily and accurately regulated.

A still further object of the invention is to produce a bead rolling machine which is wholly automatic in its operation so that the only thing the operator has to do is to place the drum on the receiving platform of the machine and to actuate the starting lever, the drum being automatically ejected after the beading operation has been completed.

These, and other objects are attained by my invention as set forth in the following specification and as shown in the accompanying drawings in which:

Fig. 2 is an enlarged sectional view taken on line 2—2 on Fig. 1.

Fig. 3 is an enlarged section on line 3—3 on Fig. 2.

Fig. 4 is a fragmentary, enlarged section, taken on line 4—4 on Fig. 1.

Fig. 5 is a greatly enlarged section on line 5—5 on Fig. 4 showing an automatic stop mechanism, the same being illustrated in its inoperative position.

Fig. 5A is similar to Fig. 5 but shows the stop mechanism in its operative position.

Figs. 9 to 14, inclusive, enlarged, are fragmentary views, partly in section and partly in elevation, showing the structure of the various valves used in operating the machine.

Fig. 15 is a vertical sectional view of one end of a drum and the lid thereof.

Figures 16, 17, 18, 19:
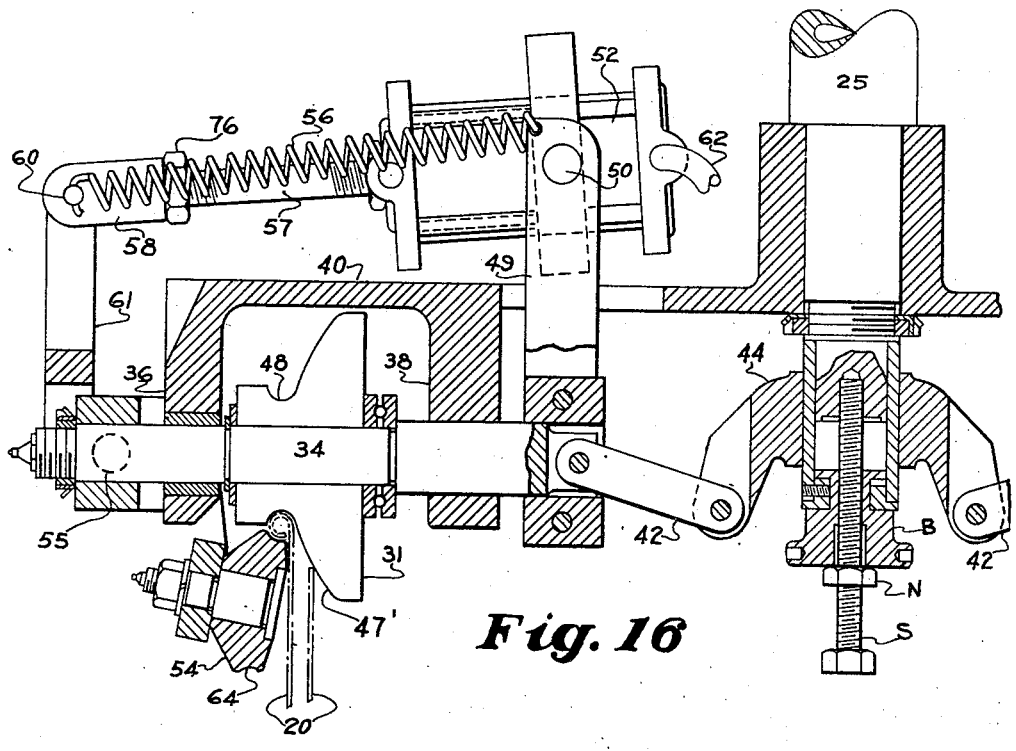

Fig. 16 is similar to Fig. 3 but showing another embodiment of the invention.

Figs. 17, 18 and 19 are fragmentary sectional views showing three steps in the formation of the bead.

The machine shown includes a suitable frame or housing 10 adapted to rest on a suitable foundation 12 with the lower part of the housing disposed in a pit below the floor 14. The housing may be provided with a floor plate 16 which extends beyond the housing and the periphery of which rests upon, and is preferably secured to the floor 14. The machine further includes a working platform 18 on which the drum 20 (Fig. 8) is adapted to be placed. The platform 18 is raised by means of an air cylinder 22 to bring the upper edge of the drum into engagement with a bead-rolling mechanism located above the platform.

The bead-forming mechanism includes a prime mover M which turns a gear 23 which meshes with a gear 24 on a hollow shaft 25, journalled in bearing 26, carried by the housing. The bead-forming mechanism also includes beading rolls 27, 28, 29, 30 and 31 which rotate freely on shafts 34 but which are keyed so as not to move longitudinally of the shafts. Each of the shafts 34 is freely slidable in openings formed in spaced pendant flanges 36 and 38 carried by a disc 40 which is carried by, and is rotatable with, shaft 25. The space between flanges 36 and 38 is such as to allow limited radial movement of the beading rolls towards, and away from, the axis of shaft 25 so as to accommodate drums of different diameters. The inner ends of the shafts 34 of the rolls 27 to 31 are pivoted to links 42 which, in turn, are pivoted to a vertically movable hub 44 which, in the embodiment of Fig. 3, is normally biased upwardly by a spring 46. This arrangement centers the rolls and it yieldably maintains them in their outermost positions. When the rim of a drum having a relatively small diameter engages, and is pushed upwardly against, the slanted outer surfaces 47 of the beading rolls, the rolls 27 to 31 can move inwardly, against the action of spring 46, to permit the edge of the smaller drum to enter the forming grooves 48 of the beading rolls. The shaft 34 of one of the beading rolls, such as roll 31, also carries two upright arms 49, to the upper ends of which is pivoted, as at 50, an air cylinder 52 for actuating an auxiliary or forming roll 54.

Figure 1:
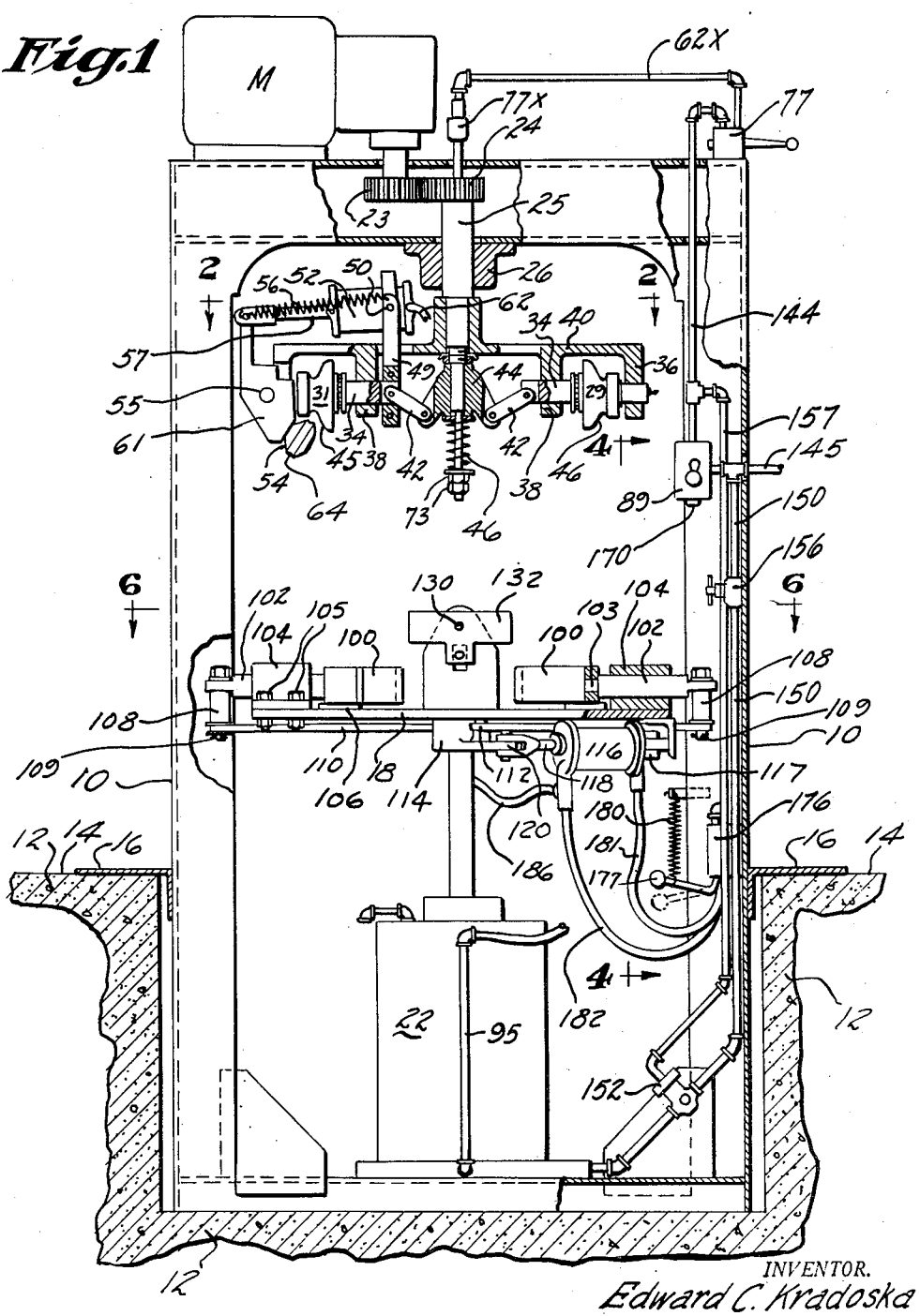
Fig. 1 is a view, partly in side elevation and partly in section of a bead rolling machine embodying the invention.

As will be seen from Figs. 1 and 2, the piston rod 57 of air cylinder 52 is adjustably threaded into a clevis 58 which is pivotally connected, by a pin 60 to the upper end of a pendent lever 61 which carries forming roll 54. The lower end of lever 61 is pivoted, as at 55, to the outer end of the shaft 34 of beading roll 31. By this construction, forming roll 54 is movable jointly with beading roll 31 relative to the axis of central shaft 25. Roll 54 is also individually rotatable about pivot 55 in a clockwise direction, or away from roll 31 and in a counterclockwise direction, or into engagement with roll 31. It will be remembered that roll 31 and all of the other rolls are urged radially outwardly by spring 46 and that they can be moved inwardly against the action of spring 46 by mere engagement of the slanting surfaces of rolls 27, 28, 29, 30 and 31 with the rim of a drum. For example, if the diameter of the drum is relatively small, its rim will engage the lower end of slanted surface 47 on each roll and, as the drum is forced upwardly, it will move rolls 27 to 31 inwardly against the action of spring 46 until the diameter of forming groove 48 corresponds to the diameter of the bead to be repaired. On the other hand the structure of air cylinder 52 and its relation to the other parts of the machine is such that, when air under pressure is admitted into cylinder 52, through pipe 62, piston rod 57 is moved to the left, as viewed in Figs. 1 and 3, so as to rotate lever 61, in counterclockwise direction about pivot 55, to move and move forming roll 54 toward roll 31 as shown in solid lines in Fig. 3. In the absence of sufficient air pressure in cylinder 52, spring 56 retracts piston 57 and rotates lever 61 in clockwise direction about pivot 55 to move roll 54 away from roll 31 or to the position shown in solid lines in Fig. 8 to permit removal of the drum.

From the foregoing description of the bead rolling mechanism it will be seen that if a drum is placed on platform 18 and raised into contact witth the slanting surface 47 of the beading rolls, as shown in Fig. 3, the rim of the drum will gradually force the beading rolls inwardly until it reaches forming groove 48. As the rim of the drum moves to this position, it is guided between the juxtaposed slanting faces 47 of roll 31 and the juxtaposed inclined surface 46x of roll 54. This prevents the upper edge of the drum from hitting the dead center of forming groove 48 and insures that the rim of the drum will follow the contour of groove 48. In other words, the rim of the drum is guided to the point at which curvature of groove 48 begins. This insures proper curvature of the bead to be formed without the necessity of exerting outward radial pressure against the end of the drum which pressure may split, or at least enlarge the end of the drum.

As the partly rolled edge of the rim moves downwardly along the outer curved position of groove 48, it comes in contact with the corresponding portion of groove 64 in roll 54. The edge of the partly formed bead is now bent first inwardly and then upwardly to form a complete bead 65. If, due to compressive stresses, the wall of the bead should buckle, it is straightened out by the rolling action of roll 54.

If it is desired to produce a looser fit between the open end of a drum 20 and lid 72 (Fig. 15) tension of spring 46 of Fig. 3 is increased by turning adjustment nut 73 in the appropriate direction. This has the effect of expanding the open end of the drum during the formation of bead 65 so that the diameter of the upper end of the drum will be greater than the diameter of the portion of the lid which enters the open end of the drum. To produce a tightly or a loosely curled bead 65 the clearance between the forming roll 54 and the adjacent beading roll 31 can be increased or decreased. This can be done by adjusting the relation of the clevis 58 to piston rod 57 to vary the stroke of the piston in cylinder 52 and thus to vary the distance between roll 31 and roll 54 when the latter is in the operative position of Fig. 3. The supply of air to cylinder 52 is controlled by a valve 77 which has a two-position control handle 78 and the structure and operation of which will be hereinafter described. It is sufficient now to point out that a pipe 62X leads from valve 77 into a rotatable packing gland 77X which is connected to the interior of shaft 25 in any suitable air tight manner. A conduit 62 delivers air from hollow shaft 25 to air cylinder 52. This construction permits air cylinder 52 to be supplied with air while it rotates with shaft 25 and the beading rolls 27 to 31.

Figure 8:
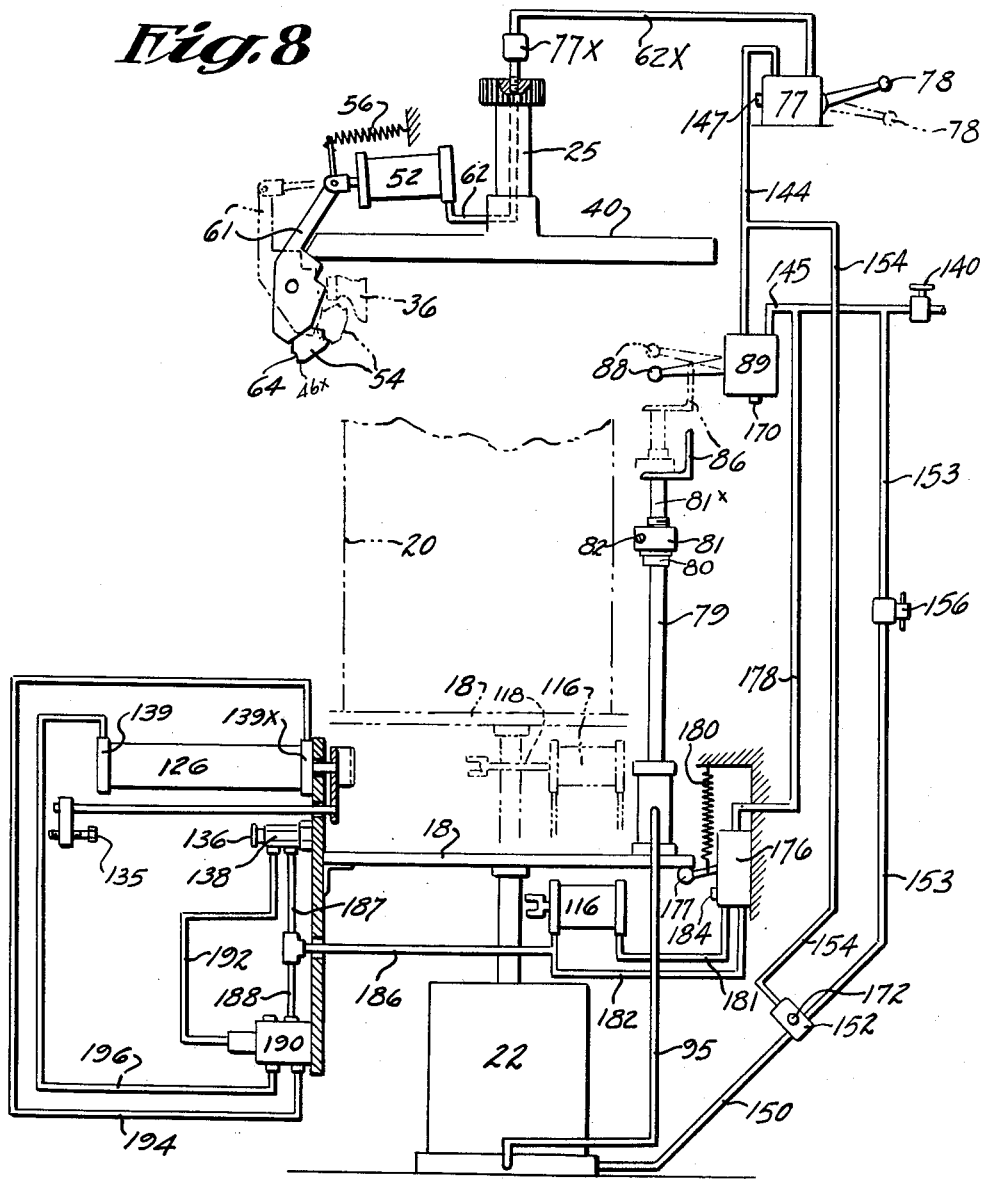
Fig. 8 is a diagrammatic representation of the operation of the machine.

In order to render the bead rolling operation automatic, in order to guard against damage, and in order to regulate the size of the bead, I provide an adjustable, pressure-operated clutch mechanism for automatically stopping the upward movement of the drum when the bead is completed. The clutch mechanism includes a vertical shaft 79 (Figs. 4, 5, and 8) which passes freely through a guide ring 80 suitably secured to housing 10. Downward movement of shaft 79 is limited by means of a split nut 81 which is clamped about the shaft by set screw 82 and which is too big to pass through ring 80. Shaft 79 is provided with a tip 81X which is adjustably threaded into split nut 81 and which terminates in an offset finger 86. The lower end of shaft 79 is adapted to pass freely through an opening 84 formed in the right hand ear or extension 85 (Fig. 6) of platform 18 so that the shaft is not normally affected by the upward or downward movement of the platform 18. The finger 86 of shaft 79 is preferably in the form of an angle and is adapted, when shaft 79 is moved upwardly, to move control handle 88 of valve 89 to its upper, valve-closing position (Figs. 4 and 8). The shaft 79 is adapted to be engaged and moved upwardly by the structure which is best shown in Figs. 5 and 5A and which includes an outer rigid sleeve 91 which rests on the right hand ear 85 of platform 18, and an inner collapsible sleeve 92. Sleeve 92 normally loosely surrounds shaft 79 and is collapsible under predetermined pressure into gripping engagement with shaft 79. The casings 91 and 92 are spaced to form an air chamber 93 and their opposite ends are clamped together in air tight manner by any suitable means such as the structure shown at the bottom of Fig. 5. Air under pressure is supplied to chamber 93 by means of a pipe 95 leading from cylinder 22 to a groove 96 formed in the inner wall of casing 91 and communicating with air chamber 93. Since the casing 91 rests on right hand ear 85 of platform 18, as viewed in Figs. 1 and 6, it will move up and down with the platform 18, and in the absence of air pressure in chamber 93 sufficient to collapse flexible sleeve 92 from its cylindrical form, shaft 79 will not be gripped by flexible sleeve 92 and the platform will slide freely relative to shaft 79 for opening 84. But, when the pressure in air chamber 93 reaches a predetermined value, flexible sleeve 92 is collapsed into tight engagement with the shaft 79, as shown in Fig. 5A, to integrate shaft 79 with casing 91. Shaft 79 is now integrated, and will move upwardly, with platform 18 to cause the offset finger 86 of shaft 79 to engage and raise control handle 88 to its upper, valve-closing position and thus stop the upward movement of the platform and the drum carried thereby, in a manner later on which will be described. It is to be also noted that the strength of the flexible casing 92 is such that the air pressure necessary to raise the platform 18 until the rim of a drum on said platform will come into contact with the groove 48 of the beading rolls is not enough to distort the casing 92 into engagement with the shaft 79. But, as the upper rim of the drum begins to bear against the wall of groove 48 of the beading rolls, the air pressure in cylinder 22, pipe 95 and chamber 93 increases correspondingly until it reaches a value sufficient to cause the casing 92 to hug or frictionally engage the shaft 79. The adjustment of the tip 81X and the resistance and pressure of casing 92 are such that, by the time the formation of the bead on the rim of the drum is completed the finger 86 engages and moves handle 88 to its upper, valve-closing position. If desired, the operator can turn valve handle 88 by hand when by observation he determines that the bead is completed.

The machine further includes means for automatically centering and clamping the drum to be operated on firmly to the platform 18 and for releasing the drum after the beading operation is completed, and means for automatically pushing the drum off the platform 18 when the latter returns to its lower position, so that all the operator has to do is merely to place a drum on the platform and start the machine.

Figure 6:
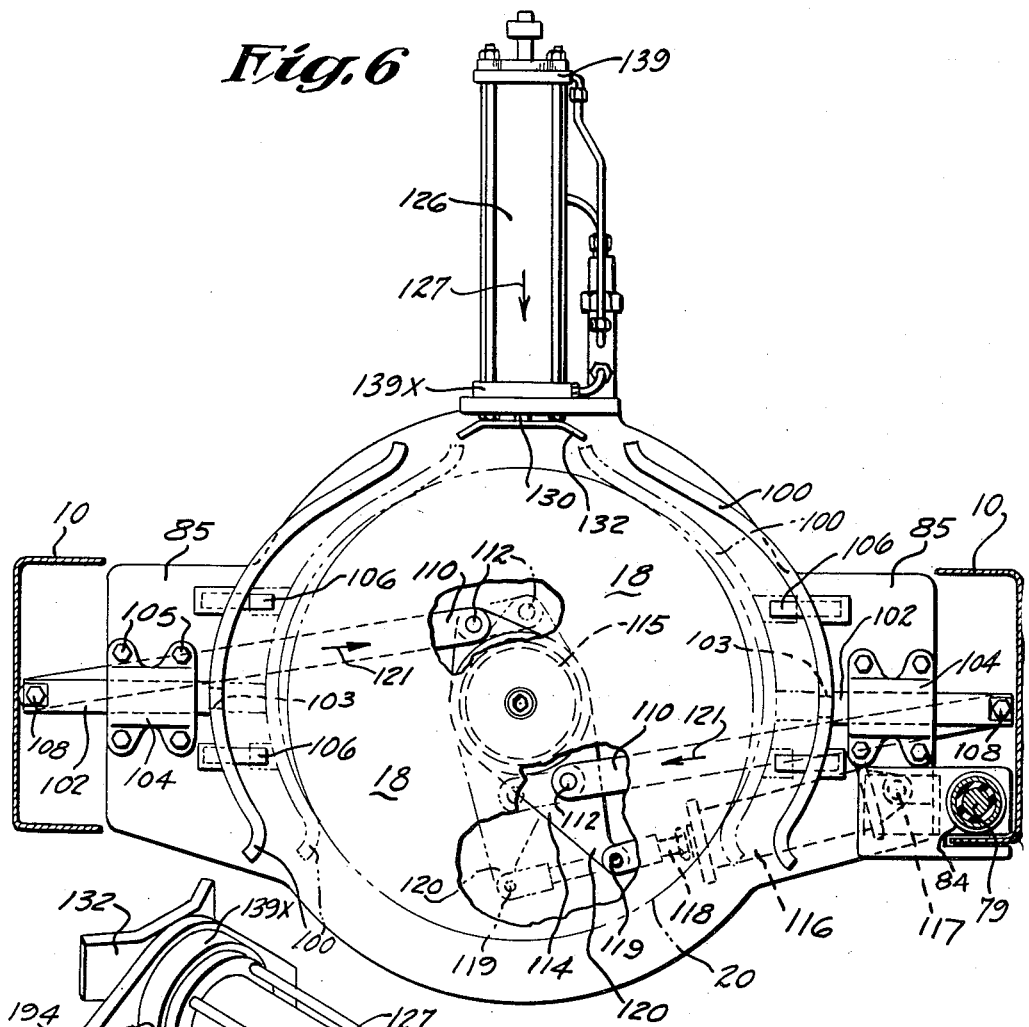
Fig. 6 is an enlarged section taken on line 6—6 on Fig. 1 and showing the drum clamping and ejecting mechanism.

The means for automatically clamping a drum to platform 18 is best shown in Figs. 1 and 6 and includes a pair of arcuate clamps 100 adapted to engage opposite sides of the drum and a pair of actuating arms 102 suitably secured to the clamps at 103. The arms 102 reciprocate in bearings 104 suitably secured, as at 105, to ears 85 of the platform 18. The clamps 100 are adapted to ride on elongated tracks 106 which are provided on the upper surface of platform 18. As will be seen from Fig. 1 the height of tracks 106 is such as to cause the clamps 100 to engage the drum at a point above the chine at the lower end of said drum. It will also be seen from Fig. 6 that the ends of the opposite clamps 100 do not meet when the clamps are in the drum engaging position so as to accommodate the pads in which bung holes are usually made.

To the outer ends of the arms 102 are secured pins 108 which are spaced outwardly from the ears 85 of platform 18 and to the bottom ends of which are pivoted, as at 109, the outer ends of links 110. The inner ends of links 110 are pivoted as at 112 to opposite sides of a casting 114 which is rotatably mounted on a hub 115 carried by platform 18. The casting 114 is rotated about axis of hub 115 by means of air cylinder 116, pivotally mounted, as at 117, and the piston rod 118 of which is pivoted, as at 119, to a lug or ear 120 of casting 114. The structure and operation of air cylinder 116 will be later on described and it is now sufficient to say that, when the piston rod 118 moves outwardly of the cylinder, or to the left as viewed in Fig. 6, the casting 114 is rotated in clockwise direction and links 110 are moved in the direction of the arrows 121 in Fig. 6, so as to move arms 102 and clamps 100 radially inwardly until the clamps engage the opposite sides of a drum on platform 18. When the piston rod 118 moves inwardly of the cylinder 116, or to the right as viewed in Fig. 6, the casting 114 is rotated in counterclockwise direction so as to move clamps 100 radially outwardly, or out of engagement with the drum. If desired, the clamping means can be activated, or inactivated manually.

Figure 7:
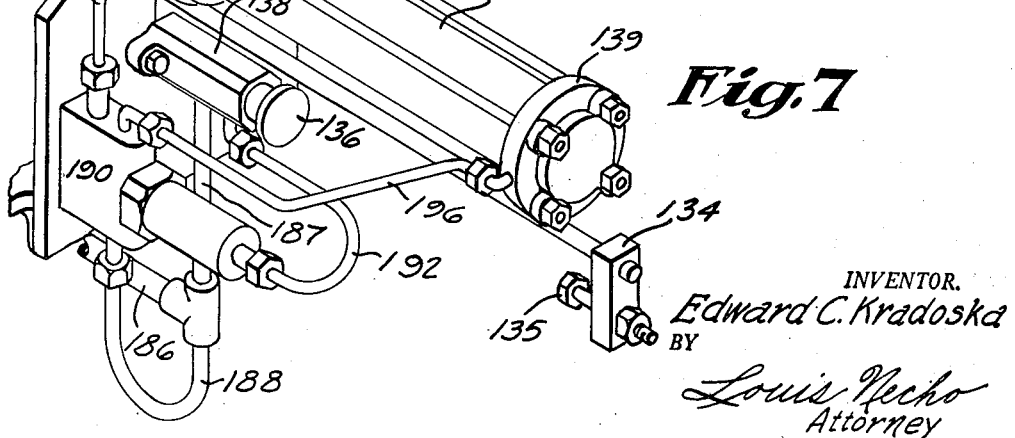
Fig. 7 is an enlarged, perspective view of the drum ejecting mechanism shown at the top of Fig. 6.

The means for pushing the drum off the platform 18 after the beading operation is completed includes an air cylinder 126 which is suitably secured in position to the rear portion of the platform 18 and the piston rod 130 (Fig. 6) of which is provided with an arcuate shoe 132 adapted to engage the vertical wall of a drum on the platform. Carried by, and movable with, the piston rod 130 of air cylinder 126 is a rod 133 which carries a block 134 in which is threaded a bolt 135 which, when piston rod 130 moves outwardly of the cylinder, or in the direction of the arrow 127 in Fig. 7, will strike against the stem 136 of valve 138. See Fig. 8. The structure and operation of air cylinder 126 and valve 138 will be later on explained and it is now sufficient to say that, when the beading operation has been completed, and when the platform 18 has moved to its lowermost position, air introduced into the right hand end 139 of cylinder 126, as viewed in Fig. 7, will move piston rod 130 in the direction of arrow 127 in Figs. 1 and 7 to push the drum off the platform. At the end of this stroke of piston rod 130, bolt 135 strikes stem 136 of air valve 138. This exhausts the air from the right hand end 139 of cylinder 126, as viewed in Fig. 7, and admits air to the left hand 139X end thereof so as to retract, or move piston rod 130 back into the cylinder or to the position shown in Figs. 6 and 7.

The beading operation is as follows:

The motor M is energized to rotate the beading and forming rolls, the main valve 140 is opened to provide a supply of air under pressure from any desirable source not shown, and the handle 78 is moved to its lower position in which the valve 77 will be open. A drum on the open end of which a bead is to be formed is then placed on platform 18 and handle 88 of valve 89 is depressed to permit the flow of air upwardly through pipe 144 to valve 77 which controls operation of air cylinder 52. Valves 77 and 89 are identical and their structure is shown in Figs. 9 and 10 from which it will be seen that when operating handles 78 and 88 are in their lower positions, air can flow through the valves and that, when the operating handles are in their upper positions, no air can flow through the valves 77 and 89. For example, air will enter valve 89 through pipe 145 leading from main valve 140 and will flow through pipe 144 to valve 77. The air entering valve 77 from pipe 144 flows through pipe 62X, packing 77X, shaft 25, and pipe 62, to air cylinder 52.

If we assume that Fig. 9 represents valve 77, the left hand pipe P1 of Fig. 9 will correspond to pipe 144 and the right hand pipe P2 will correspond to pipe 62X. If we assume that Fig. 9 represents valve 89, the left hand pipe P1 will correspond to pipe 145 and the right hand pipe P2 will correspond to pipe 144. Therefore, if handles 78 and 88 are depressed to "open" valves 77 and 89, air cylinder 52 will be actuated in a manner to cause forming roll 54 to move into engagement with beading roll 31 or to the position shown in solid lines in Fig. 3 and in broken lines in Fig. 8.

The air cylinder 22 is supplied with air under pressure by means of pipe 150 which leads from one side of pilot operated valve 152. The opposite sides of valve 152 are connected, by means of pipes 153 and 154 to main valve 140 and to pipe 144, respectively. If desired, a restricting valve 156 may be cut into pipe 153 to control the rate of pressure build up of the air in cylinder 22. The structure of pilot valve 152 is shown in Fig. 11 from which it will be seen that spring 160 normally keeps valve discs 161 and 162 in their upper position in which lower disc 161 closes opening 164 and in which upper disc 162 does not obstruct opening 165. When air under sufficient pressure enters the valve through pipe 154, spring 160 is compressed and the valve discs move down to a position in which disc 161 ceases to obstruct opening 164 and in which disc 162 obstructs opening 165. Air from pipe 153, as regulated by restricting valve 156, now flows through opening 164 and pipe 150, into cylinder 22 to raise the platform 18 to a position in which its upper end may be operated on by the beading rolls. It will be noted that chamber 93 is connected by means of pipe 95 to the air cylinder 22 and is therefore always subjected to the pressure of the air in cylinder 22. Therefore, as long as the upward movement of the drum is unobstructed, the casing 92 remains uncollapsed and can move freely relative to the shaft 79. In other words, shaft 79 will not move upwardly with initial movement of the platform. But, as the beading operation progresses, the resistence to the further movement of the drum increases and this, in turn, progressively increases the air pressure in cylinder 22, in pipe 95 and in chamber 93. By the time the beading operation is well on its way, the air pressure in cylinder 22, pipe 95 and chamber 93 reaches a value sufficient to collapse sleeve 92 into engagement with shaft 79 which will now begin to move upwardly with the platform. As previously stated, the adjustments of the parts are such that, by the time a bead has been formed, the finger 86 of shaft 79 will strike and move control handle 88 to its upper, valve-closing position. This cuts valve 77 from the source of compressed air and opens exhaust port 168 in valve 89 (see Figs. 9 and 10) to exhaust the air from cylinder 52 through exhaust outlet 170 (Figs. 1 and 8). The spring 56 now moves forming roll 54 out of engagement with roll 31 or to the position in which it is out of registration with groove 48, so that the drum is now free to move downwardly. In the absence of air pressure in pipe 154, the spring 160 returns the parts of valve 152 to the position shown in Fig. 11 and the air in cylinder 22 is exhausted through outlet 172 (Fig. 8). In the absence of air pressure in cylinder 22 the platform will move downwardly by gravity.

When it is desired to re-roll an existing bead, valve handle 78 of valve 77 is moved to its upper valve-closing position (Fig. 8) in which the supply of compressed air to cylinder 52 is cut off. The spring 56 now moves roll 54 to its out of the way position (solid line position of Fig. 8). This permits insertion of the beaded rim of a drum into forming groove 48 after which control handle 78 of valve 77 is depressed to its valve-opening position.

The mechanism for clamping a drum to, and releasing it from, platform 18 includes a valve 176 (Fig. 12) the control handle 177 of which projects into the path of movement of the platform 18. The valve 176 is supplied with air under pressure through pipe 178 which leads directly from main valve 140. The control handle 177 of valve 176 is normally biased to an upper position by a spring 180 the upper end of which is secured to the housing 10. The valve 176 is connected by pipes 181 and 182 to opposite sides of the piston of air cylinder 116 which actuates the clamps 100 as above set forth. The structure of valve 176 is such that, when control handle 177 is in its lower position, air from pipe 178 will reach pipe 182 which leads to the left hand end of cylinder 116 and that when the handle 177 is in its upper position air from pipe 178 will reach pipe 181 which leads to the right hand end of cylinder 116. Therefore, as soon as platform 18 rises enough to permit spring 180 to raise handle 177, compressed air flowing through pipe 181 will push piston rod 118 outwardly relative to cylinder 116 so as to move clamps 100 from the disengaging, solid line position, to the drum-engaging, broken line position as shown in Fig. 6. By this means, as the drum moves toward the beading rolls, it is firmly clamped to platform 18 and it is centered with reference to the beading rolls. When the platform 18 moves control handle 177 to its lower position, as shown in Fig. 4, the air in cylinder 116 is exhausted through outlet 184, and air will now flow through pipe 182 to retract piston rod 118 and thus move clamps 100 outwardly, or to the disengaging position shown in solid lines in Fig. 6.

The mechanism for pushing the drum 20 off the platform 18 is supplied with air under pressure through pipe 186 which receives air directly from pipe 182, only after the platform 18 has moved down and actuated control handle 177 to disengage clamps 100 from the drum. The pipe 186 is connected, by means of pipe 187 to one side of valve 138 the other side of which is connected by means of pipe 192 to one side of valve 190. The other side of valve 190 is connected by means of pipe 188 to pipe 186. The opposite sides of valve 190 are connected, by means of pipes 194 and 196, to the opposite sides of air cylinder 126.

The structures of valves 138 and 190 are shown in Figs. 13 and 14, respectively, from which it will be seen that, when valve stem 136 is in its outer position, as shown in Fig. 13, the air in pipes 186 and 187 cannot reach pipe 192, and valve 190. Therefore, and assuming the parts of valve 190 to be in the position of Fig. 14, air from pipes 188 and 186 will flow, through valve 190 and pipe 196, to the right hand end 139 of cylinder 126, as viewed in Fig. 7, to force piston rod 130, carrying the shoe 132, outwardly across platform 18 and thus pushes the drum off the platform. When this takes place, bolt 135 strikes valve stem 136 of valve 138 and moves it, against action of spring 198, to the right as shown in Figs. 8 and 13. This permits air from pipe 187 to flow, through valve 138 and through pipe 192, to actuate piston 200 of valve 190 and allow air to flow through pipe 188, valve 190 and pipe 194 to the left hand end 139X of cylinder 126, as viewed in Fig. 7, so as to retract piston rod 130 to the position shown in Figs. 6 and 7. When this takes place, the air in valve 190 and pipe 192 is exhausted through outlet 202.

This condition remains until the platform 18 again rises at which time air under pressure in the pilot head of valve 190 passes back through pipe 192, valve 138, pipe 187, pipe 186 and pipe 182 and is exhausted through valve 176. In the absence of pressure therein, valve 190 automatically resets itself and is ready for another cycle of operation.

In the embodiment of Fig. 16, I dispense with spring 46 and substitute therefor a stud S which threadedly engages a block B carried by the lower end of pipe 25 and which is provided with a lock nut N. The upper end of stud S carried hub 44' which corresponds to hub 44 of Fig. 3. By this arrangement, turning stud S in a direction to raise hub 44' increases the diameter of the bead forming mechanism and vice versa. The adjustment effected by turning stud S is more positive and is more accurately controllable than the adjustment offered by spring 46. For light work and where extreme accuracy is not needed, spring 46 will do. But for heavier work and where extreme accuracy is indicated the arrangement of Fig. 16 is preferred.

Also, in the embodiment of Fig. 16 the slanted surfaces 47 of the beading rolls are replaced by a spherical surface, or radius 47'. In other words, surface 47' is a part of a sphere instead of a cone. This I found provides a better guide for the edge of the drum than the arrangement of Fig. 3. Obviously, the spherical radius 47' can not be clearly shown without extreme exaggeration and must therefore be assumed.

Double acting cylinders are well known and are available in many forms, on the market. Therefore their internal structure has not been shown nor described. Likewise, the valves of Figs. 9 to 14, inclusive, are well known and are available on the market and therefore their internal structure and their operation have been shown and described only to the extent necessary for the understanding of the operation of the machine.

From the foregoing it will be seen that, once the motor M is started and main valve 140 turned on, it is merely necessary for the operator to place a drum on platform 18 and to pull control handle 88 of valve 89 down. For re-rolling an existing bead control handle 78 of valve 77 is moved up either momentarily or during the entire bead re-rolling operation.

It will be seen from the foregoing that, in its preferred forms, the invention resides in the provision of a beading machine which operates wholly automatically but this does not preclude manual operation of the controls when needed or desired.

In the disclosure, air cylinders are shown as a preferred form of actuating means because they possess certain advantages but I do not wish, in the absence of limiting art, to be limited to the use of air cylinders and I want my invention understood as encompassing the use of other actuating means which is so constructed and arranged as to operate automatically in the sequence and in the manner above set forth, it being only necessary that the progress, or the completion of one step be instrumental in triggering the next step. To this end, and only by way of example, electric motors and limit switches can be substituted for the air cylinders, and the coacting parts. Specifically, an electric motor may be used to raise the platform and a limit switch can be so placed as to be opened, to deactivate the motor, when the platform reaches an uppermost limit which is reached only after the bead has been fully formed. Similarly, limit switches can be substituted for lever 177 (Fig. 8) and on and off switches can be submitted for valve 140 and valve 77 and so on.

This application is a continuation, in part, of my co-pending application Serial No. 228,917, filed May 29, 1951, entitled Bead Forming and Re-Rolling Machine, now abandoned.

In the drawings there is shown an open end drum, and in the specification and in the claims reference is made to the formation of a bead on the edge of an open end container. However, it is obvious that the apparatus can be used for re-rolling and already formed, or existing bead on the end of a closed drum and I desire the invention and the claims to be understood as covering this operation also.

What I claim is:

1. Apparatus for forming a bead on the edge of an open end container, said means including a bead-forming mechanism, a platform for supporting said container, actuating means for moving said platform toward said bead-forming mechanism to engage the edge of said container with said bead-forming mechanism, clamps carried by said platform and disposed outside, and on opposite sides of said container, and a trigger mechanism located in the path of movement of said platform toward said bead-forming mechanism and normally operative to activate said clamps into engagement with said container as soon as said platform begins to move toward said head forming mechanism.

2. The structure recited in claim 1 in which trigger mechanism is engaged by said platform upon movement of said platform from said bead forming mechanism to disengage said clamps from said container.

3. Apparatus for forming a bead on the edge of an open end container, said apparatus including a bead-forming mechanism, a platform for supporting the container, actuating means for moving the platform toward said bead-forming mechanism, clamps carried by said platform for clamping the container to the platform, actuating means for bringing said clamps into engagement with said container and for disengaging said clamps from said container, a lever for controlling the action of said actuating means, said lever being located in the path of movement of said platform and being movable to a first position in which said actuating means brings the clamps into engagement with the container and to a second in which said actuating means disengages said clamps from said container, means for normally automatically moving said lever to its first position upon movement of the platform toward the beading mechanism, said lever being moved to its second position by the reverse movement of said platform.

4. The structure recited in claim 3 and ejecting means operable by movement of said lever to its second position for pushing the container off the platform.

5. The structure referred to in claim 4 in which the ejecting means includes a fluid-pressure-reciprocable ram, and valve means located in the path of movement of said ram and operable by movement of the ram in the direction of the container to subject said ram to fluid pressure in a manner to retract said ram after the container has been pushed off the platform.

6. Apparatus for forming a bead on the edge of a drum, said apparatus including a vertically reciprocable platform adapted to support said drum, a rotary bead-forming mechanism located above said platform and including at least one beading roll, driving means for rotating said bead-forming mechanism about the axis of said drum, a first air cylinder adapted to raise said platform to bring the upper edge of said drum into contact with said bead-forming mechanism, a source of air under pressure, a valve for supplying air from said source to said first air cylinder, a forming roll mounted for movement to a first position in which it engages said beading roll and to a second position in which it is disengaged from said beading roll, means normally moving said forming roll to its second position, a second air cylinder adapted when supplied with air under pressure, to move said forming roll to its first position and means for supplying air under pressure to said second cylinder through said valve, whereby the closing of said valve shuts the supply of air from both of said cylinders, said valve including an exhaust outlet which communicates with both of said cylinders and which is opened automatically upon the closing of said valve to exhaust the air from said cylinders and to permit said forming roll to move to its second position and to permit said platform to move to its lower position.

7. Apparatus for forming a bead on the edge of a drum said apparatus including a vertically reciprocable platform adapted to support said drum, a rotary bead-forming mechanism located above said platform and including at least one beading roll, driving means for rotating said bead-forming mechanism about the axis of said drum, an air cylinder adapted to raise said platform to bring the upper edge of said drum into contact with said bead-forming mechanism, a source of air under pressure, a valve for supplying air from said source to said first air cylinder, clamping means located above and movable with said platform for clamping said drum, actuating means including a system of linkage and a double acting air cylinder adapted, when air is supplied to one side thereof, to actuate said clamps through said linkage system, to a first position in which said clamps engage said drum and adapted, when air is admitted to the other side thereof to move said clamps to a second position in which said clamps are disengaged from said drum, a two-position valve for selectively admitting air to either side of said double acting cylinder, a control handle for said valve, said handle being movable to an upper position in which said valve supplies air to said double acting cylinder in a direction to move said clamps to said first position and means operable upon upward movement of said platform to move said handle to its upper position, said handle being located in the path of movement of said platform and being engageable by said platform when the latter moves to its lower position, whereby said handle is moved to its lower position in which said valve supplies air to said double acting air cylinder in a direction to move said clamps to said second position.

8. Apparatus for forming a bead on the edge of a drum, said apparatus including a vertically reciprocable platform adapted to support said drum, a rotary bead-forming mechanism located above said platform and including at least one beading roll, driving means for rotating said bead-forming mechanism about the axis of said drum, a first air cylinder adapted to raise said platform to bring the upper edge of said drum into contact with said bead-forming mechanism, a source of air under pressure, a valve for supplying air from said source to said first air cylinder, a control air cylinder, means suplying air under pressure to said control cylinder, a two position control handle for said control cylinder, said handle being movable to a first position and to a second position, an ejecting ram adapted to move across the top of said platform to push said drum off said platform, a double acting air cylinder for moving said ram to a first position to push said drum off the platform and to a second position in which said ram is retracted away from above said platform, servo means for supplying air selectively to either side of said double acting cylinder, means connecting said control cylinder in flow relation to said servo means, and means operatively connecting said double acting cylinder to said servo means, said control cylinder being so constructed and arranged that in the first position of said control handle, said control cylinder supplies air to said servo means and in the second position of said handle said control cylinder does not supply air to said servo means.

9. A bead forming mechanism for rolling a bead on the edge of an open end drum, said mechanism including a vertically disposed supporting member having a vertical axis, a plurality of shafts arranged radially in a circle normal to the axis of said member, beading rolls carried by the outer ends of said shafts and freely rotatable about the axes of their respective shafts, means mounting said shafts for radial movement towards, and away from, said supporting member, a platform for supporting a cylindrical work piece, means for raising said platform to bring the upper edge of said work piece into engagement with said beading rolls with a predetermined pressure, and yielding means normally biasing said shafts radially outwardly to adapt said rolls for operating on the edge of a work piece of a relatively large diameter, the faces of said rolls engageable with said edge of said work piece being slanted downwardly and inwardly for progressive engagement with the edge of a work piece of a relatively smaller diameter, the force of said yielding means being of a value less than that required for deforming said edge of said work piece, whereby said rolls are moved radially inwardly by the pressure of the upper edge of the work piece there against, into a position in which they can act on the edge of a work piece having a relatively smaller diameter.

10. The structure recited in claim 9, and a forming roll pivotally carried by the end of one of said shafts outwardly of the beading roll carried by said shaft, yielding means normally biasing said forming roll away from said beading roll, and means for moving said forming roll toward said beading roll against the action of said yielding means.

11. Apparatus for forming a bead on the edge of an open and cylindrical work piece, said apparatus including a bead forming mechanism, a platform for supporting said work piece, a fluid pressure actuated means for moving said platform in a direction to bring the edge of said work piece into engagement with said bead forming mechanism, a first conduit for supplying fluid under pressure of a predetermined value to said fluid pressure actuated means, a fluid pressure responsive means carried by, and movable with, said platform, a second conduit so arranged with respect to said fluid pressure actuated means as to be subject to pressure variations therein and connected to said pressure responsive means for supplying fluid pressure thereto, a valve for controlling the flow of fluid pressure through said conduits, a valve actuating member relative to which said fluid pressure responsive means is normally freely movable, said fluid pressure responsive means being engageable with said actuating member for joint movement with said platform to close said valve when said fluid pressure responsive member is subjected to the pressure of a fluid under pressure of said pre-determined value.

12. The structure recited in claim 9 in which said fluid pressure responsive means is in the nature of a collapsible sleeve and said actuating member is in the nature of a shaft which is freely movable through said sleeve in the absence of fluid pressure acting on said sleeve, and in which said sleeve collapses into engagement with said shaft when said sleeve is subjected to fluid pressure of said predetermined value.

13. Apparatus for forming a bead on the edge of an open end cylindrical work piece, said apparatus including a bead forming mechanism, a platform for supporting said work piece, fluid pressure actuating means for moving said platform in a direction to bring the end of the work piece into engagement with said bead forming mechanism, a source of fluid under pressure of a predetermined value sufficient to overcome the resistance of the material of which said work piece is formed, a first conduit for connecting said first fluid pressure actuated means to said source, a second fluid pressure actuated means comprising a sleeve carried by, and movable with, said platform, a shaft relative to which said sleeve is normally freely movable, a second conduit so arranged with respect to said first fluid pressure actuated means as to be subject to pressure variations therein and connected to said second fluid pressure actuated means to subject said sleeeve to fluid pressure under the same pressure occurring in said first pressure actuated means, and a valve movable to a first position in which it stops the flow of fluid through said conduits and to a second position in which it permits the flow of fluid through said conduits, said sleeve being collapsible, when subjected to pressure of said predetermined value into engagement with said shaft to move the latter jointly with said platform and into engagement with said valve to move said valve from its first to its second position.

References Cited in the file of this patent

UNITED STATES PATENTS

| 421,212 | Walsh | Feb. 11, 1890 |
| 511,567 | Walsh | Dec. 26, 1893 |
| 1,467,027 | Dolan | Sept. 4, 1923 |
| 2,286,692 | Smith | June 16, 1942 |
| 2,475,465 | White | July 5, 1949 |
| 2,703,952 | Perriguey | Mar. 15, 1955 |

FOREIGN PATENTS

| 25,629 | Australia | Feb. 26, 1931 |